United States Patent
Van Mill et al.

(10) Patent No.: US 12,391,321 B2
(45) Date of Patent: Aug. 19, 2025

(54) TRACK CONFIGURATION FOR A FARM IMPLEMENT

(71) Applicant: Unverferth Manufacturing Co., Inc., Kalida, OH (US)

(72) Inventors: Michael D. Van Mill, Shell Rock, IA (US); John Walvatne, Parkersburg, IA (US)

(73) Assignee: UNVERFERTH MANUFACTURING CO., INC., Kalida, OH (US)

( * ) Notice: Subject to any disclaimer, the term of this patent is extended or adjusted under 35 U.S.C. 154(b) by 833 days.

(21) Appl. No.: 17/577,193

(22) Filed: Jan. 17, 2022

(65) Prior Publication Data
US 2023/0227115 A1    Jul. 20, 2023

(51) Int. Cl.
*B62D 55/084* (2006.01)
*B62D 55/06* (2006.01)
*B62D 55/104* (2006.01)

(52) U.S. Cl.
CPC .......... *B62D 55/104* (2013.01); *B62D 55/06* (2013.01); *B62D 55/084* (2013.01)

(58) Field of Classification Search
CPC .... B62D 55/104; B62D 55/06; B62D 55/084; B62D 55/105; B62D 55/116; B62D 55/30; B60Q 1/0491; B61D 45/008; B32B 2553/02; B29L 2030/002; G06F 2212/462; E04F 11/104; E04F 2011/1046; E01B 2203/01; E01B 9/56; E06C 7/082; B60G 2300/32
USPC ....................................................... 280/28.5
See application file for complete search history.

(56) References Cited

U.S. PATENT DOCUMENTS

| | | | |
|---|---|---|---|
| 5,316,381 A | 5/1994 | Isaacson et al. | |
| 5,452,949 A | 9/1995 | Kelderman | |
| 5,899,542 A | 5/1999 | Lykken et al. | |
| 6,712,549 B2 | 3/2004 | Roth | |

(Continued)

FOREIGN PATENT DOCUMENTS

| | | | | |
|---|---|---|---|---|
| CA | 2887154 A | | 10/2015 | |
| CN | 104477264 A | * | 4/2015 | ........... B62D 55/065 |

(Continued)

OTHER PUBLICATIONS

English translation of CN 104477264 A (also attached). (Year: 2015).*

*Primary Examiner* — Valentin Neacsu
*Assistant Examiner* — Nathaniel William Watkins
(74) *Attorney, Agent, or Firm* — Rothwell, Figg, Ernst & Manbeck, P.C.

(57) ABSTRACT

A track assembly for a farm implement includes a camber arm mounted in a camber arm housing, a first mounting bracket coupled to the upper connection point on the front end and pivotably coupled to the lower pivot point on the front end, and a second mounting bracket coupled to the upper connection point on the back end and pivotably coupled to the lower pivot point on the back end. The track assembly further includes first and second set arms having idler wheel sets mounted on one end and bogie wheel sets mounted on another end. The first set arm is pivotably coupled to the first mounting bracket, and the second set arm is pivotably coupled to the second mounting bracket, such that the idler wheel sets and bogie wheel sets are movable in opposing vertical directions.

9 Claims, 11 Drawing Sheets

(56) References Cited

U.S. PATENT DOCUMENTS

| | | |
|---|---|---|
| 7,380,892 B2 | 6/2008 | Rosenboom |
| 7,726,749 B2 | 6/2010 | Rosenboom |
| 7,740,084 B2 | 6/2010 | Rosenboom |
| 8,342,257 B2 | 1/2013 | Rosenboom |
| 8,528,657 B1 | 9/2013 | Rosenboom |
| 8,763,716 B2 | 7/2014 | Rosenboom |
| 9,415,818 B1 | 8/2016 | Tiede et al. |
| 9,434,426 B2 | 9/2016 | Nagorcka et al. |
| 9,434,427 B1 | 9/2016 | Tiede et al. |
| 9,440,691 B2 | 9/2016 | Rosenboom |
| 9,457,854 B2 | 10/2016 | Van Mill et al. |
| 9,505,454 B1 | 11/2016 | Kautsch |
| 10,112,663 B1 | 10/2018 | Kautsch |
| 10,137,949 B2 * | 11/2018 | Kahlig ................ B62D 55/244 |
| 10,239,569 B2 | 3/2019 | Van Mill et al. |
| 10,259,512 B2 | 4/2019 | Rosenboom |
| 10,308,296 B2 | 6/2019 | Piens et al. |
| 10,343,734 B2 | 7/2019 | Sauvageau et al. |
| 10,399,619 B1 | 9/2019 | Kautsch |
| 10,526,027 B2 | 1/2020 | Sauvageau et al. |
| 10,633,044 B2 | 4/2020 | Sauvageau et al. |
| 10,875,591 B2 | 12/2020 | Lunkenbein |
| 11,572,111 B2 | 2/2023 | Tiede et al. |
| 2005/0077784 A1 | 4/2005 | Dudzinski et al. |
| 2014/0367181 A1 * | 12/2014 | Van Mill ................ B62D 55/08 180/9.1 |
| 2015/0321708 A1 * | 11/2015 | Van Mill ................ B62D 55/24 280/28.5 |
| 2017/0313367 A1 * | 11/2017 | Hellholm ............. B62D 55/084 |
| 2019/0168831 A1 | 6/2019 | Van Mill et al. |
| 2020/0307727 A1 * | 10/2020 | Sauvageau ........... B62D 55/305 |
| 2021/0024147 A1 * | 1/2021 | Brazier ................ B62D 55/12 |

FOREIGN PATENT DOCUMENTS

| | | | |
|---|---|---|---|
| WO | WO-2016049760 A1 * | 4/2016 | ......... B62D 55/096 |
| WO | 20190162247 A1 | 8/2019 | |

* cited by examiner

FIG. 8A
SECTION A-A

TRACK CONFIGURATION FOR A FARM IMPLEMENT

FIELD OF THE DISCLOSURE

This disclosure relates generally to farm implements, and more particular, to a track configuration for a farm implement such that the track assembly is able to better conform to the terrain when the farm implement is towed behind a tractor or otherwise moved.

BACKGROUND

Mobile farm implements may generally include wheels or track assemblies to support the frame and allow a tow vehicle such as a tractor to move the farm implement. Mobile farm implements such as grain carts, seed tenders, and sprayers are used in fields in which the terrain may be uneven. If the track assemblies are not able to follow the contours of the terrain, it may cause stress on the track assemblies or the implement, which may cause failure or increased wear. In the case of towable farm implements, the farm implements are also required to closely follow the path of a tow vehicle to avoid moving off the path and damaging crops. Therefore, it is desirable to have track assemblies for a farm implement that can adapt to the unevenness of the terrain and closely follow the path of the tow vehicle.

One solution is provided by U.S. Pat. No. 9,457,854, the content of which is hereby incorporated in its entirety.

SUMMARY

High loading or uneven weight across the track assembly wheels can cause higher stresses in the track components. Accordingly, there is a need to provide an improved track configuration for a farm implement such that the track assembly is able to better conform to the terrain when the farm implement is towed behind a tractor or otherwise moved and that can address issues of high loading or uneven weight across the track assembly when conforming to the terrain.

According to a first aspect, embodiments of a farm implement are provided. In some embodiments, the farm implement may include left and right track assemblies for assisting in moving the farm implement along a ground surface in a line of travel, wherein each track assembly comprises: a camber arm mounted in a camber arm housing, such that the camber arm permits the camber arm housing to pivot about a first axis perpendicular to the line of travel and a second axis parallel to the line of travel; wherein the camber arm housing has a front end and a back end, and further has upper connection points on both the front end and back end and lower pivot points on both the front end and back end; a first mounting bracket coupled to the upper connection point on the front end and pivotably coupled to the lower pivot point on the front end; a second mounting bracket coupled to the upper connection point on the back end and pivotably coupled to the lower pivot point on the back end; a first set arm having a first idler wheel set mounted on one end and a first bogie wheel set mounted on another end, wherein the first set arm is pivotably coupled to the first mounting bracket such that the first idler wheel set and first bogie wheel set are movable in opposing vertical directions; a second set arm having a second idler wheel set mounted on one end and a second bogie wheel set mounted on another end, wherein the second set arm is pivotably coupled to the second mounting bracket, such that the second idler wheel set and second bogie wheel set are movable in opposing vertical directions.

In some embodiments, the farm implement further includes a first suspension member connected to the upper connection point on the front end and between the first mounting bracket and the front end. In some embodiments, the farm implement further includes a second suspension member connected to the upper connection point on the back end and between the second mounting bracket and the back end. In some embodiments, the first and second mounting brackets are triangle-shaped members. In some embodiments, one or both of the first and second suspension members comprise one or more of: a hydraulic cylinder having a hydraulic accumulator, a spring, a gas strut, and a shock. In some embodiments, the second mounting bracket is pivotably coupled to the camber arm housing.

In some embodiments, the first idler wheel set is pivotable about a third axis perpendicular to the line of travel and the first bogie wheel set is pivotable about a fourth axis perpendicular to the line of travel, such that the first idler wheel set and the first bogie wheel set are independently pivotable relative to each other. In some embodiments, the second idler wheel set is pivotable about a fifth axis perpendicular to the line of travel and the second bogie wheel set is pivotable about a sixth axis perpendicular to the line of travel, such that the second idler wheel set and the second bogie wheel set are independently pivotable relative to each other.

In some embodiments, the first set arm is pivotable about a seventh axis perpendicular to the line of travel allowing the first bogie wheel set and the first idler wheel set to move generally vertically. In some embodiments, the second set arm is pivotable about an eighth axis perpendicular to the line of travel allowing the second bogie wheel set and the second idler wheel set to move generally vertically. In some embodiments, the first axis perpendicular to the line of travel is movable generally vertically when the farm implement transitions from an unloaded configuration to a loaded configuration.

Other features and characteristics of the subject matter of this disclosure, as well as the methods of operation, functions of related elements of structure and the combination of parts, and economies of manufacture, will become more apparent upon consideration of the following description and the appended claims with reference to the accompanying drawings, all of which form a part of this specification, wherein like reference numerals designate corresponding parts in the various figures.

BRIEF DESCRIPTION OF THE DRAWINGS

The accompanying drawings, which are incorporated herein and form part of the specification, illustrate various embodiments of the subject matter of this disclosure. In the drawings, like reference numbers indicate identical or functionally similar elements.

DETAILED DESCRIPTION

While aspects of the subject matter of the present disclosure may be embodied in a variety of forms, the following description and accompanying drawings are merely intended to disclose some of these forms as specific examples of the subject matter. Accordingly, the subject matter of this disclosure is not intended to be limited to the forms or embodiments so described and illustrated.

Unless defined otherwise, all terms of art, notations and other technical terms or terminology used herein have the same meaning as is commonly understood by persons of ordinary skill in the art to which this disclosure belongs. All patents, applications, published applications and other publications referred to herein are incorporated by reference in their entirety. If a definition set forth in this section is contrary to or otherwise inconsistent with a definition set forth in the patents, applications, published applications, and other publications that are herein incorporated by reference, the definition set forth in this section prevails over the definition that is incorporated herein by reference.

Unless otherwise indicated or the context suggests otherwise, as used herein, "a" or "an" means "at least one" or "one or more."

This description may use relative spatial and/or orientation terms in describing the position and/or orientation of a component, apparatus, location, feature, or a portion thereof. Unless specifically stated, or otherwise dictated by the context of the description, such terms, including, without limitation, top, bottom, above, below, under, on top of, upper, lower, left of, right of, in front of, behind, next to, adjacent, between, horizontal, vertical, diagonal, longitudinal, transverse, radial, axial, etc., are used for convenience in referring to such component, apparatus, location, feature, or a portion thereof in the drawings and are not intended to be limiting.

Furthermore, unless otherwise stated, any specific dimensions mentioned in this description are merely representative of an exemplary implementation of a device embodying aspects of the disclosure and are not intended to be limiting.

As used herein, the term "adjacent" refers to being near or adjoining. Adjacent objects can be spaced apart from one another or can be in actual or direct contact with one another. In some instances, adjacent objects can be coupled to one another or can be formed integrally with one another.

As used herein, the terms "substantially" and "substantial" refer to a considerable degree or extent. When used in conjunction with, for example, an event, circumstance, characteristic, or property, the terms can refer to instances in which the event, circumstance, characteristic, or property occurs precisely as well as instances in which the event, circumstance, characteristic, or property occurs to a close approximation, such as accounting for typical tolerance levels or variability of the embodiments described herein.

Although the terms horizontal and vertical are used here with respect to augers, such augers may not be completely horizontal or completely vertical. For example, the vertical auger may be angled so as to increase a side reach and/or forward reach of the auger relative to the hopper. Likewise, the horizontal auger may have a slope to it, and may also move with the hopper as the grain cart travels over uneven terrain. The terms denote the general direction in which grain is moved, e.g. horizontal movement to displace grain to a lift auger or vertical movement to lift grain to a discharge height.

Figure 1:
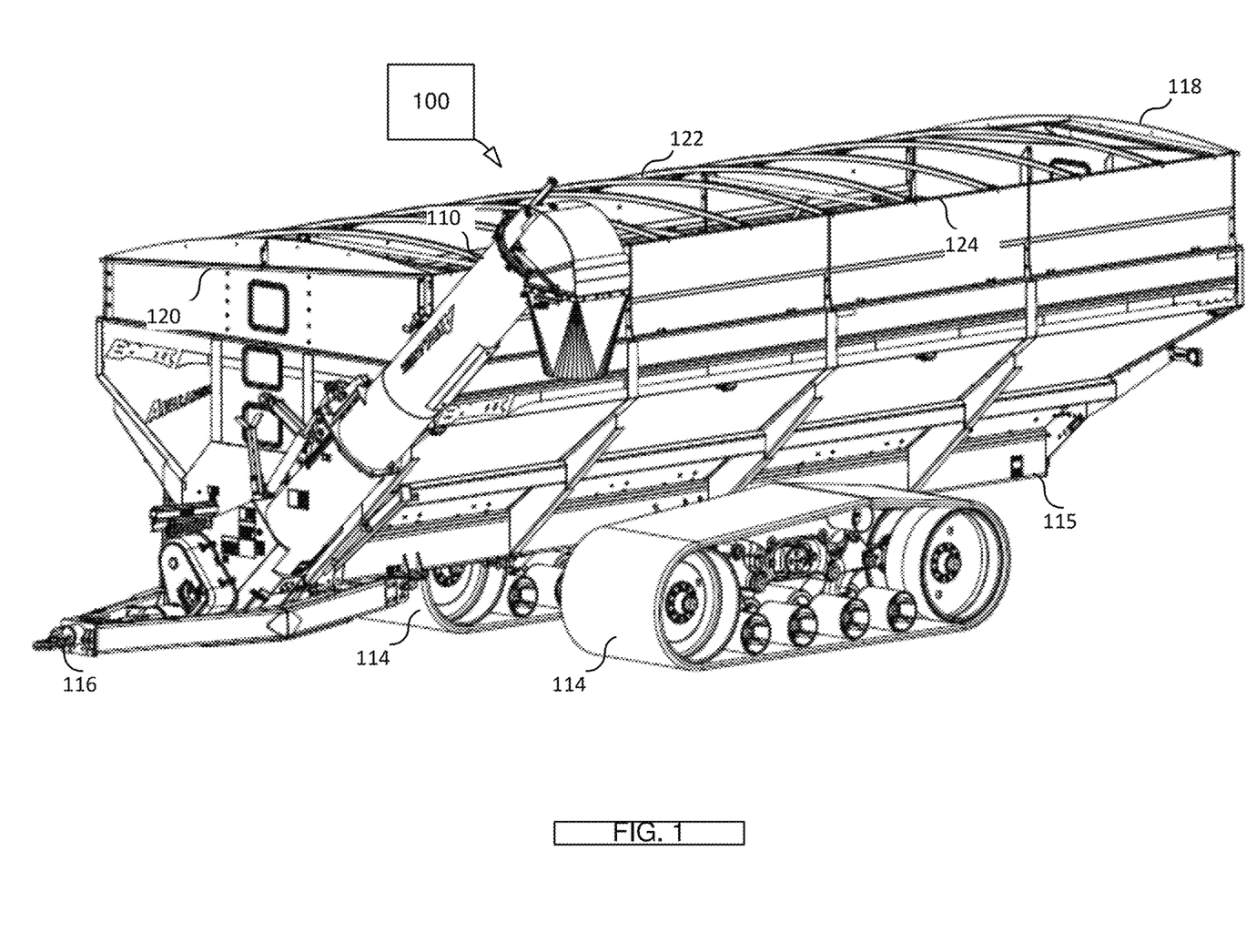
FIG. 1 is an isometric view of a track assembly on a grain cart according to an embodiment.
Figure 2:
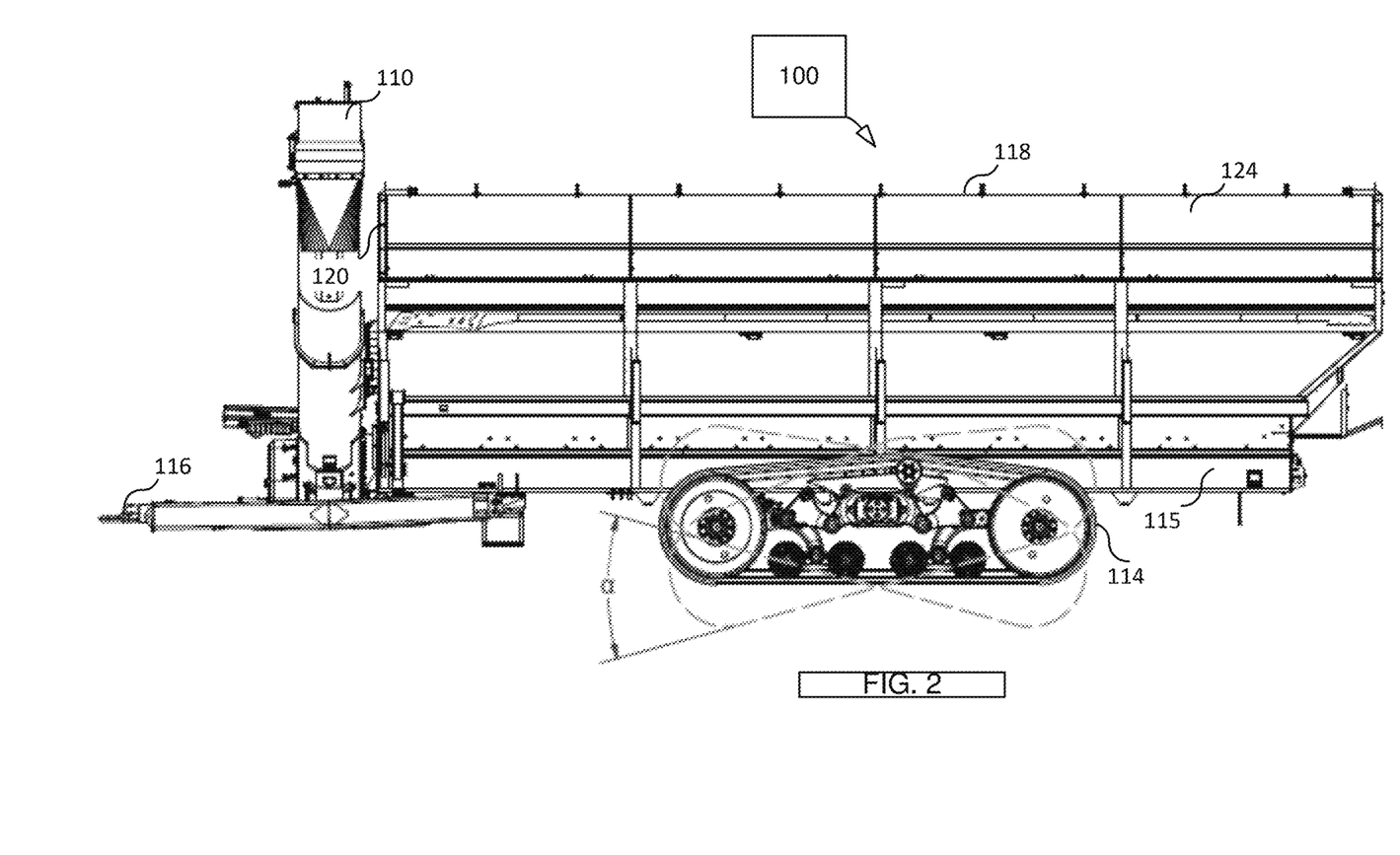
FIG. 2 is a side view of a track assembly on a grain cart according to an embodiment.
Figure 3:
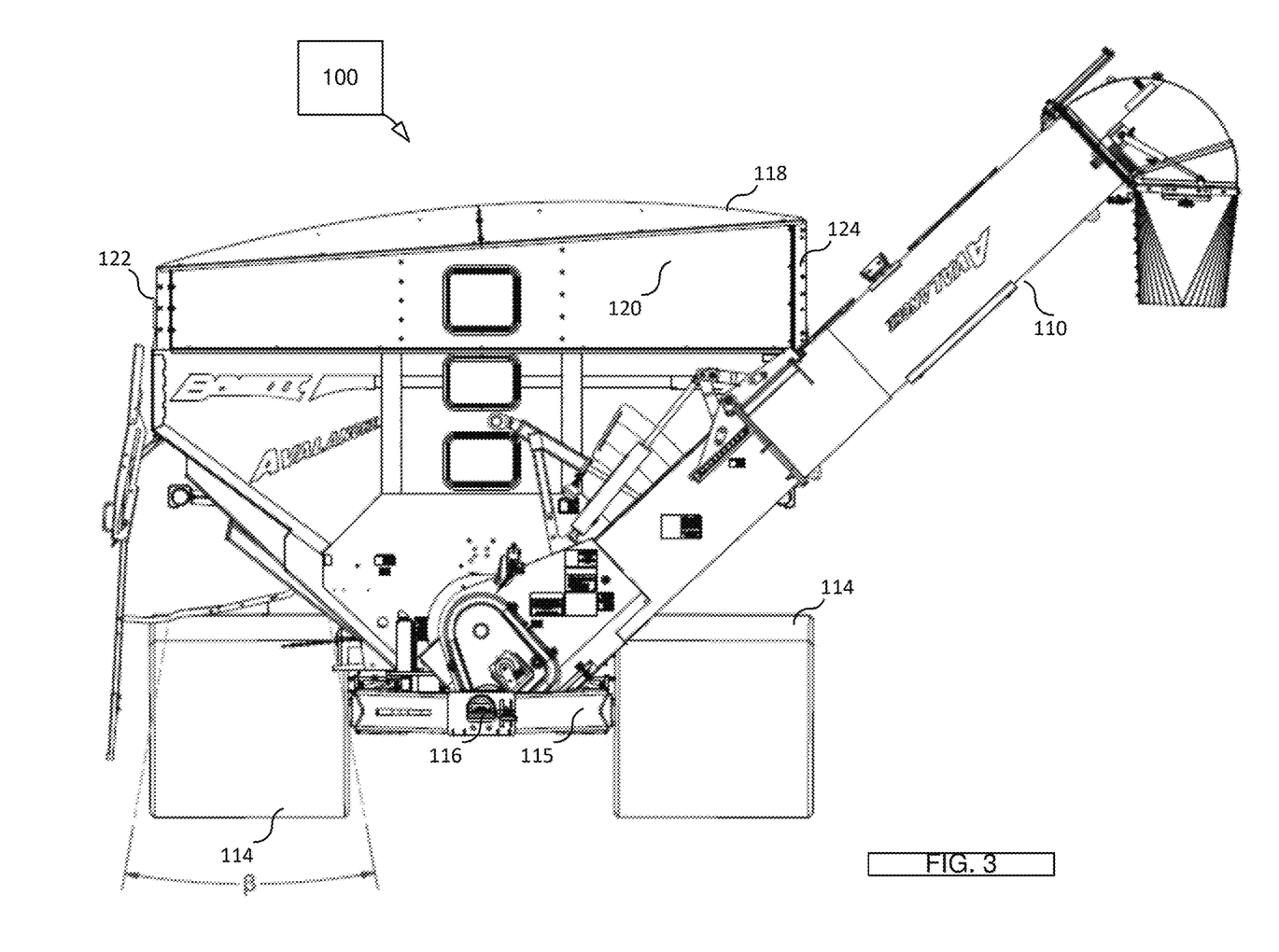
FIG. 3 is a front view of a track assembly on a grain cart according to an embodiment.

FIGS. 1-3 depict an exemplary grain cart 100 with a track assembly 114 according to an embodiment of the present disclosure. Like part numbers refer to the same or similar parts in the figures. As shown, the grain cart 100 includes a grain holding container or hopper 118 mounted on a frame 115 with track assemblies 114 on either side of the frame 115 for moving the grain cart 100 and a hitch 116 for coupling the grain cart 100 to a vehicle (such as a tractor). The hopper 118 includes a front wall or side 120, laterally opposed side walls 122 and 124, and a rear wall or side, which together define a grain holding space with a bottom, and which may have an open top. In some embodiments, as shown in FIG. 1, the opposed side walls 122 and 124 of the hopper 118 are angled toward each other to form a trough that extends along a bottom of the hopper 118 to promote grain flow toward the bottom of the hopper 118. In some embodiments the walls may be curved, or sloped differently than shown, in order to promote grain flow toward the bottom of the hopper 118.

Grain cart 100 may include one or more auger assemblies, e.g. for unloading grain from the hopper 118, such as auger assembly 110. Auger assembly 110 may be a dual auger assembly, which includes a horizontal auger assembly disposed toward a bottom of or below the hopper 118 and extending substantially along the trough of the hopper 118 so as to receive grain flow falling or flowing toward the bottom of the hopper 118, and a substantially vertical auger assembly for discharging grain. In some embodiments, a horizontal auger assembly may extend along a substantial portion of the length of the hopper 118, up to and including the entire length of the hopper 118. The horizontal auger assembly may be configured to convey agricultural material (such as grain) collected at the bottom of the hopper 118 toward a discharge opening disposed at the front wall 120 of the hopper 118. In some embodiments, grain cart 100 may have more or fewer augers than shown. Alternatively, auger assembly 110 may be a single auger assembly, which includes a substantially vertical auger assembly that is fed by gravity.

Each track assembly 114 is pivotally coupled to frame 115. As shown in FIG. 2, a track assembly 114 may pivot about a horizontal pivot axis perpendicular to the direction of travel, for example, by up to a degrees. The track assembly 114 is depicted in FIG. 2 with dashed lines to show the extent of pivoting about the horizontal pivot axis perpendicular to the direction of travel. As shown in FIG. 3, a track assembly 114 may also pivot about a horizontal pivot axis parallel to the direction of travel, for example, by up to R degrees. The extent of pivoting about the horizontal pivot axis parallel to the direction of travel is depicted in FIG. 3 with dashed lines. Although FIGS. 2 and 3 depict the pivoting of one track assembly 114, in embodiments both track assemblies 114, one on each side of the frame 115, pivot as depicted for one of the track assemblies 114.

Figure 4:
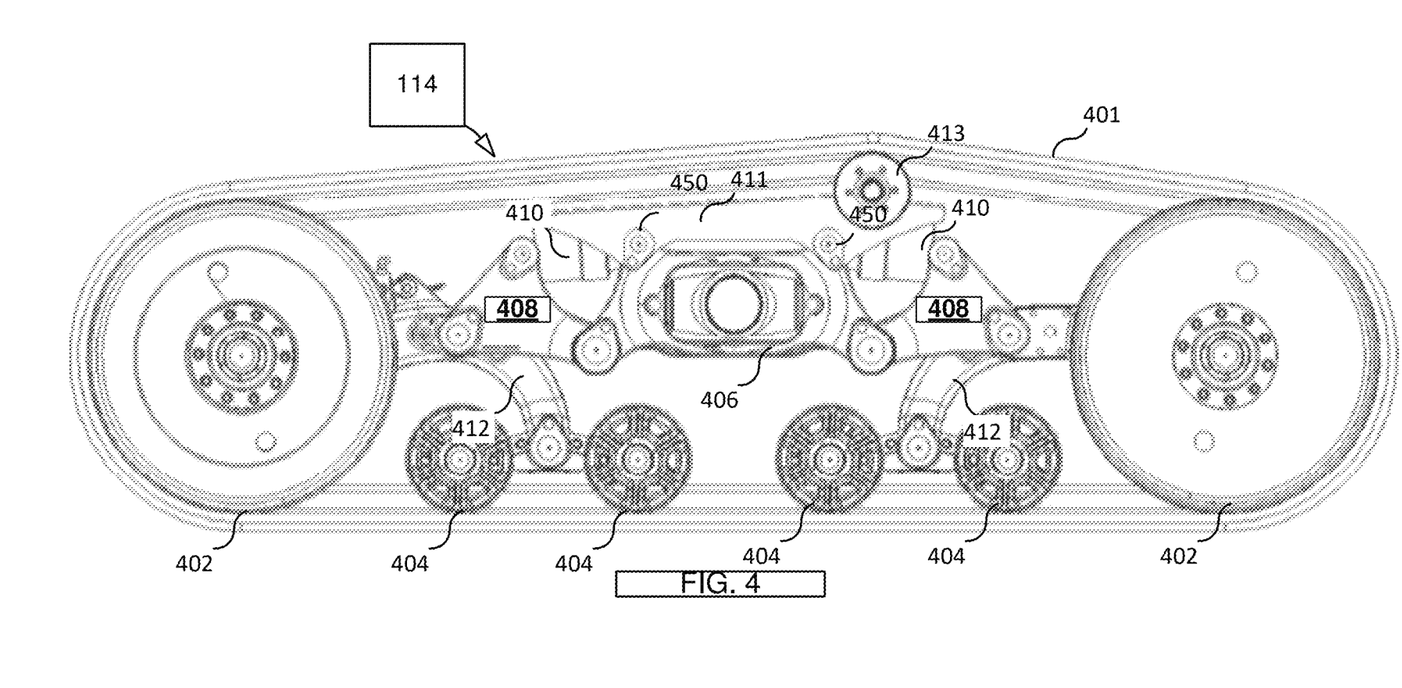
FIG. 4 is a side view of a track assembly according to an embodiment.

FIG. 4 illustrates a side view of track assembly 114 according to an embodiment of the present disclosure. FIG. 4 depicts the track assembly 114 on flat ground, as it would appear on an empty (unloaded) grain cart. Track assembly 114 includes a track 401, idler wheel assembly 402, bogie wheel assembly 404, a trunnion assembly 406, suspension arms 408, suspension members 410, suspension member cover 411, and rocker arms 412. Idler wheel assembly 402 is located in the front and in the rear of the track assembly 114, and each of the front and rear idler wheel assemblies 402 includes two idler wheels on opposite sides of the corresponding rocker arm 412 that are mounted on an axle assembly for the idler wheels. Bogie wheel assembly 404 is located in the front and rear of the track assembly 114, and each of the front and rear bogie wheel assemblies 404 include four bogie wheels, two bogie wheels on opposite faces of the corresponding rocker arm 412 that are mounted on a first axle assembly for the bogie wheels and two bogie wheels on opposite faces of the corresponding rocker arm 412 that are mounted on a second axle assembly for the bogie wheels. Track 401 may be an endless (or continuous) track belt looping around the track assembly 114.

Figure 10:
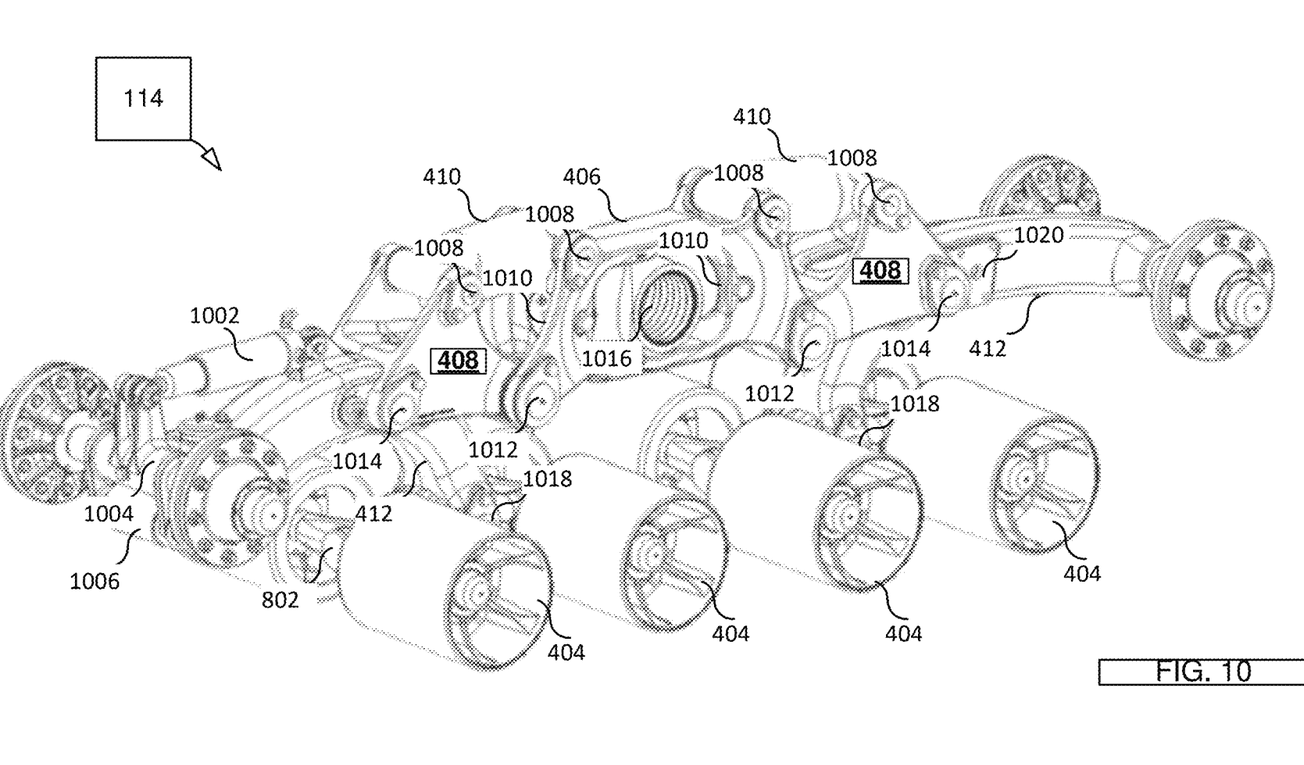
FIG. 10 is an isometric view of a track assembly according to an embodiment.

Trunnion assembly 406 allows the track assembly to pivot about a horizontal axis perpendicular to the direction of travel (such as track assembly pivot axis 1016 shown in FIG. 10) and about a horizontal axis parallel to the direction of travel (such as trunnion assembly camber axis 1010 shown in FIG. 10). Trunnion assembly 406 includes a trunnion connecting these pivot axes. Suspension member cover 411 helps to reduce debris buildup on the trunnion assembly 406 and suspension members 410, as well as to position the axle assembly for the upper track belt idle wheel 413. The upper track belt idle wheel 413 helps to prevent the track belt 401 from bouncing up and down and contacting the trunnion assembly 406 when or if the track belt 401 bounces downward.

Front and rear suspension arms 408, front and rear suspension members 410, and front and rear rocker arms 412 are located on either side of the trunnion assembly 406. The respective suspension arms 408 connect the trunnion assembly 406 with the respective rocker arms 412. The respective rocker arms 412 connect the respective idler wheel assemblies 402 to the respective pair of bogie wheel assemblies 404. Front and rear suspension members 410 are connected between the respective suspension arm 408 and the trunnion assembly 406 (at upper connection points 450). Suspension members 410 may include hydraulic cylinders with accumulators, springs, gas shocks, and other members capable of providing suspension. Suspension members 410 may be oriented, for example, generally in the direction of travel. In some embodiments, one or both of suspension members 410 may be replaced with a fixed connection, or otherwise modified, so that the respective suspension arm 408 does not pivot with respect to the trunnion assembly 406.

As shown in FIG. 4, trunnion assembly 406 is generally in the center of the track assembly 114 along the direction of travel. The trunnion assembly 406 includes four connection points, with suspension members 410 being connected at top front and rear connection points and suspension arms 408 being connected at bottom front and rear connection points. Suspension arms 408 include three connection points, the suspension member 410 and trunnion assembly 406 already mentioned are connected at two of the connection points, and the rocker arm 412 is connected at the third connection point. As shown, the three connection points of the suspension arms 408 form a triangle, and in embodiments, suspension arms 408 may be roughly triangular in shape. Rocker arms 412 include three connection points, with idler wheel assembly 402 connected to a connection point at one end of rocker arm 412, bogie wheel assembly 404 connected to a connection point at another end of rocker arm 412, and the suspension arm 408 connected to a connection point in between the other two connection points. As shown, rocker arms 412 may be arced or curved in shape. Variations on this design are possible. For example, one of the rocker arms 412 may be pivotably connected to the camber arm housing instead of suspension arm 408.

The connection of the suspension arms 408 to the rocker arms 412, on which the bogie and idler wheel assemblies are connected, allows rocker arm 412 to pivot (such as about rocker arm pivot axis 1014 shown in FIG. 10 that is a horizontal axis perpendicular to the direction of travel), allowing the bogie and idler wheel assemblies to move generally vertically. This vertical movement, as well as the pivoting trunnion assembly 406 and the suspension members 410, improves wheel and track belt ground contact, also known as track assembly ground contouring, as well as reduces the load spikes transmitted into the farm implement, the track assembly, and/or the track assembly components.

The connection of the suspension arm 408 to the suspension member 410 allows for pivoting, such as about suspension member pivot axis 1008 shown in FIG. 10, which is a horizontal axis perpendicular to the direction of travel. The connection of the suspension arm 408 to the trunnion assembly 406 allow for pivoting, such as about suspension arm pivot axis 1012 shown in FIG. 10, which is a horizontal axis perpendicular to the direction of travel.

Figure 5:
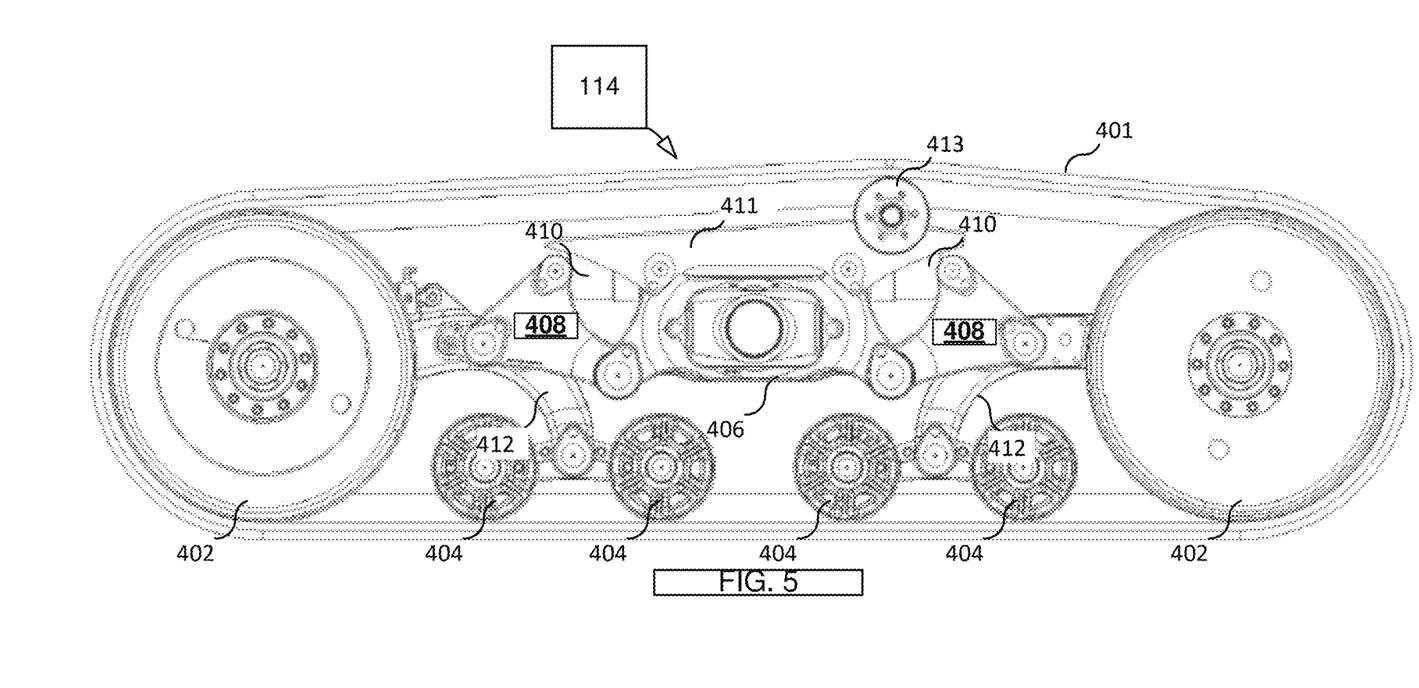
FIG. 5 is a side view of a track assembly according to an embodiment.

FIG. 5 illustrates a side view of track assembly 114 according to an embodiment of the present disclosure. Whereas FIG. 4 depicts the track assembly 114 on flat ground, as it would appear on an empty (unloaded) grain cart, FIG. 5 depicts the track assembly 114 on flat ground as it would appear on a loaded grain cart. As illustrated, the load compresses or shortens the overall length of suspension members 410, causing the suspension arms 408 to pivot upward and moving the vertical height of the main track pivot axis 1016 (shown in FIG. 10) closer to the ground. In an embodiment, the main track pivot axis 1016 may move by as much as 2 inches (e.g., from 29 inches when empty to 27 inches when the cart is fully loaded). In other embodiments, the main track pivot axis 1016 may move more or less when under load.

Figure 6:
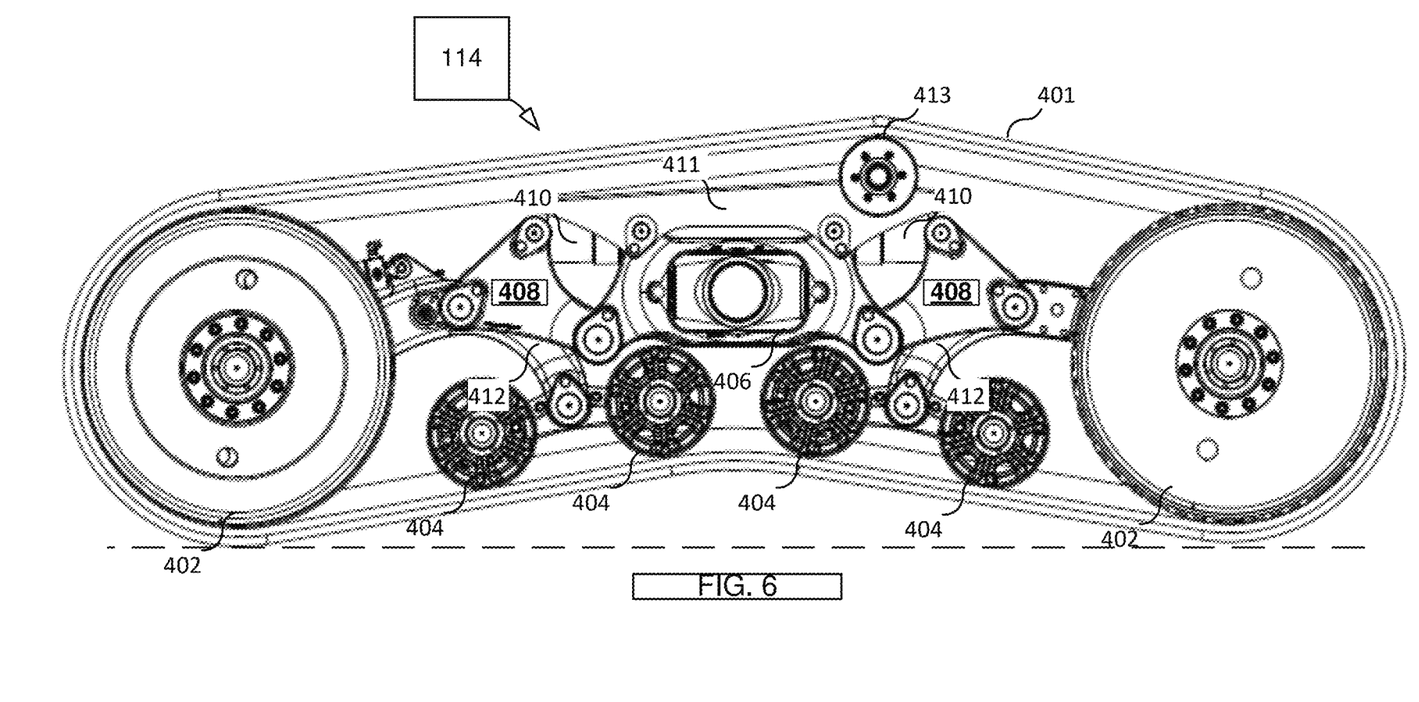
FIG. 6 is a side view of a track assembly according to an embodiment.

FIG. 6 illustrates a side view of track assembly 114 according to an embodiment of the present disclosure. FIG. 6 depicts the track assembly 114 on as it would contour when going over terrain that is higher in the middle of the track assembly 114 than the idler wheel assemblies 402. The dashed line indicates the lowest point of the terrain. The rocker arms 412 pivot about the suspension arm pivot connection 1012 (shown in FIG. 10), bringing the pair of bogie wheel tandem assemblies 404 closer to the trunnion assembly 406 while the idler wheel assemblies 402 move downward and the idler wheel assemblies 402 move downward relative to the main track pivot axis 1016. The bogie wheel tandem assembly 404 vertically oscillates about the rocker arm connection via an axis perpendicular to the direction of travel, such as bogie wheel tandem assembly pivot axis 1018 shown in FIG. 10.

Figure 7:
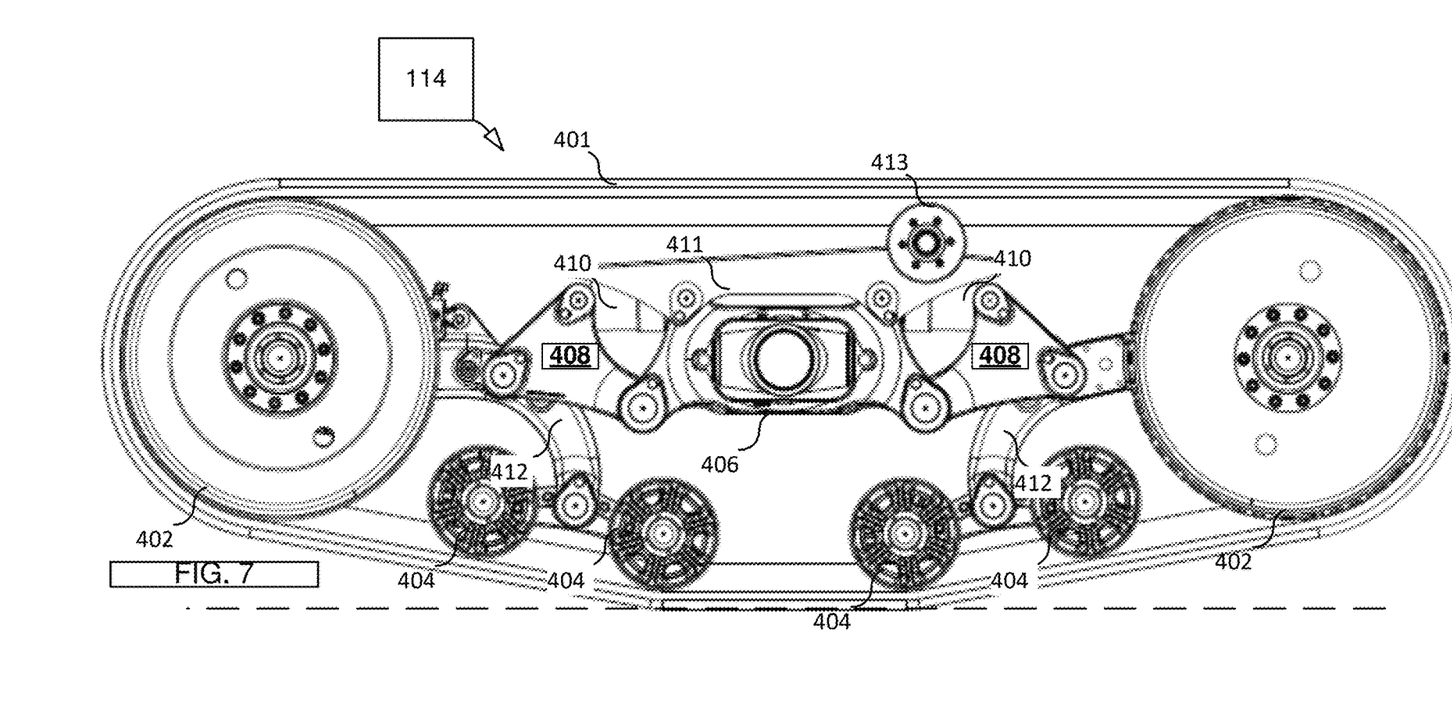
FIG. 7 is a side view of a track assembly according to an embodiment.

FIG. 7 illustrates a side view of track assembly 114 according to an embodiment of the present disclosure. FIG. 7 depicts the track assembly 114 on as it would contour when going over terrain that is lower in the middle of the track assembly 114 than the idler wheel assemblies 402. The dashed line indicates the lowest point of the terrain. The rocker arm 412 pivots about the suspension arm pivot connection 1012 (shown in FIG. 10), moving the pair of bogie wheel tandem assemblies 404 away from the trunnion assembly 406 and the idler wheel assemblies 402 move upward relative to the main track pivot axis 1016 (shown in FIG. 10).

Figure 8:
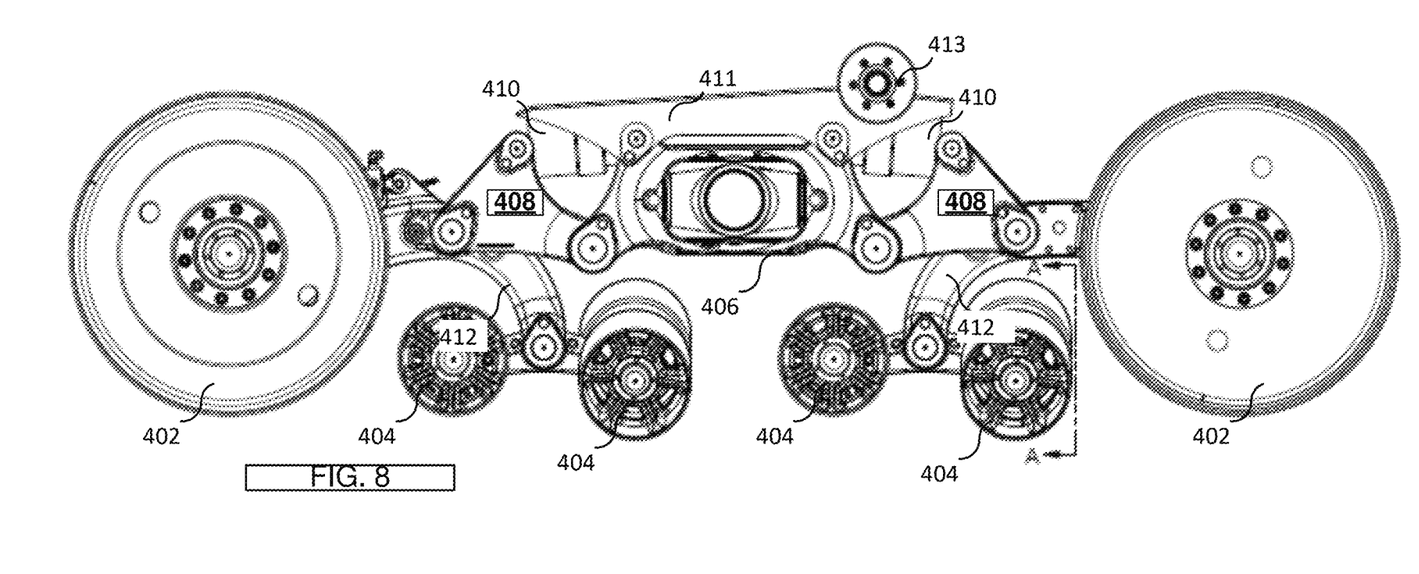
FIG. 8 is a side view of a track assembly according to an embodiment.
Figure 8A:
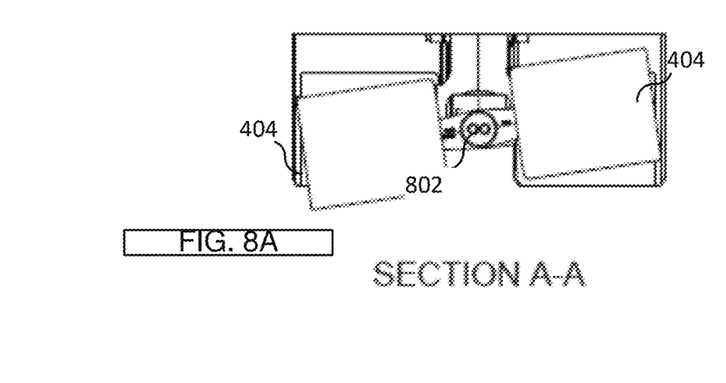
FIG. 8A is a sectional view of FIG. 8 along line A-A.

FIG. 8 illustrates a side view of track assembly 114 according to an embodiment of the present disclosure. As shown, track 401 has been removed for illustrative purposes. FIG. 8A is a cross-section along line A-A shown in FIG. 8. Two of the four bogie wheel assemblies 404 are oscillated side to side from level position on axes parallel to the direction of travel located between the bogie wheels. The section view in FIG. 8A further shows the bogie wheel axle assembly oscillated, and further shows the bogie wheel axle assembly pivot axis 802 which is a horizontal axis parallel to the direction of travel. In embodiments, all of the bogie wheel assemblies 404 can oscillate in this manner. Likewise, in other embodiments, some or all of the bogie wheel assemblies 404 may be fixed such that they do not tilt or oscillate side to side. In embodiments, there may be a combination of fixed and oscillating bogie wheel assemblies 404. Also, in embodiments there may be more or fewer bogie wheel assemblies 404 per track assembly 114.

Figure 9:
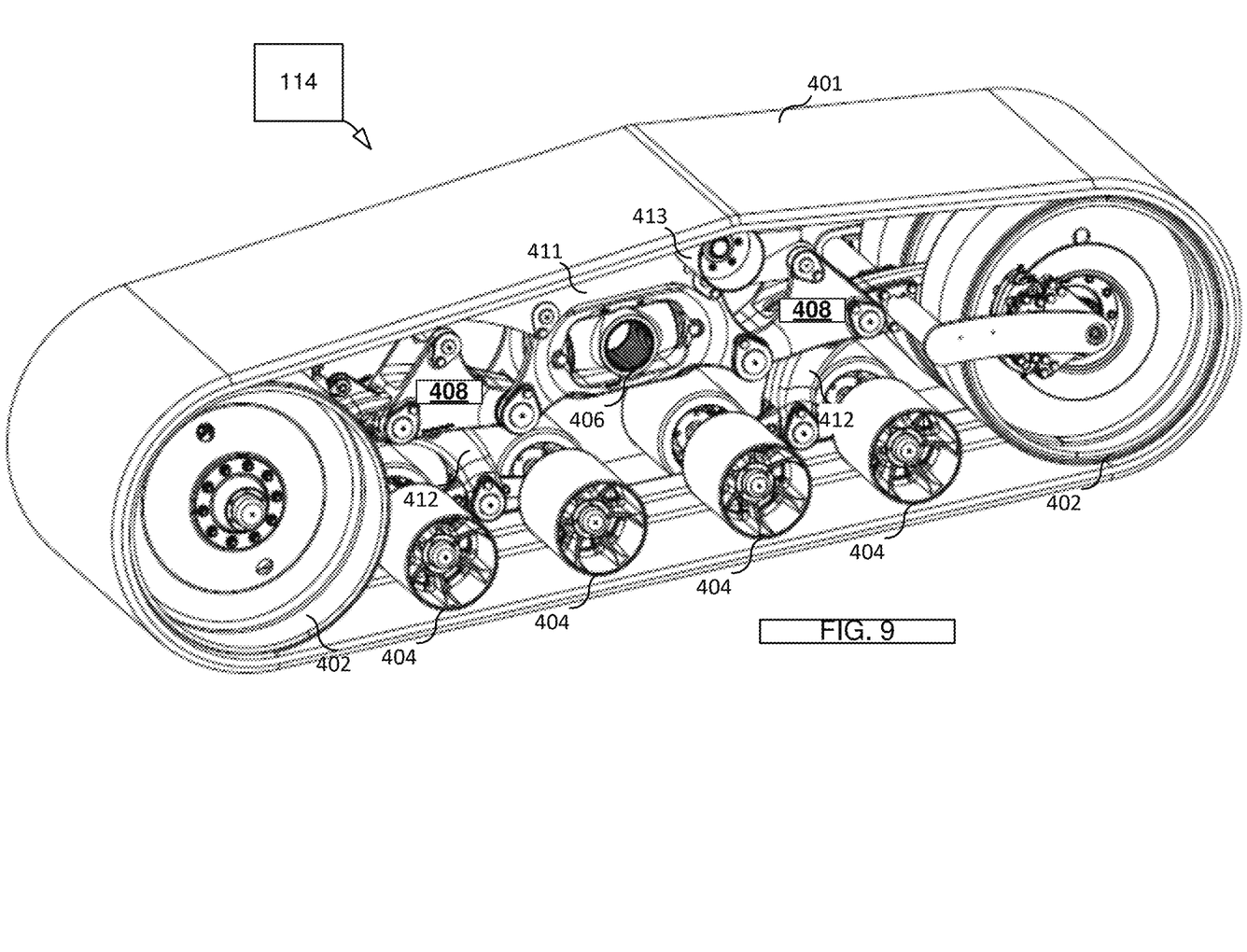
FIG. 9 is an isometric view of a track assembly according to an embodiment.

FIG. 9 illustrates an isometric view of track assembly 114 according to an embodiment of the present disclosure. FIG. 10 illustrates an isometric view of track assembly 114 according to an embodiment of the present disclosure. As shown, the track 401 has been removed for illustrative purposes in FIG. 10. The tensioner member 1002 and tensioner arm 1004 (which provides force for belt tension) are visible in this view. The tensioner arm 1004 pivots about an axis perpendicular to the direction of travel connected to the alignment arm 1006. The alignment arm 1006 is connected to one of the rocker arms 412 via a vertical pivot. Hardware on the opposite end is used to pivot and hold the position of the alignment arm 1006 to shift the belt and achieve good belt alignment.

Brake arm mounting position 1020 is a mounting point for a brake system, such as, for example, the brake system disclosed in U.S. application Ser. No. 16/601,966, the entire contents of which are herein incorporated by reference.

Figure 11:
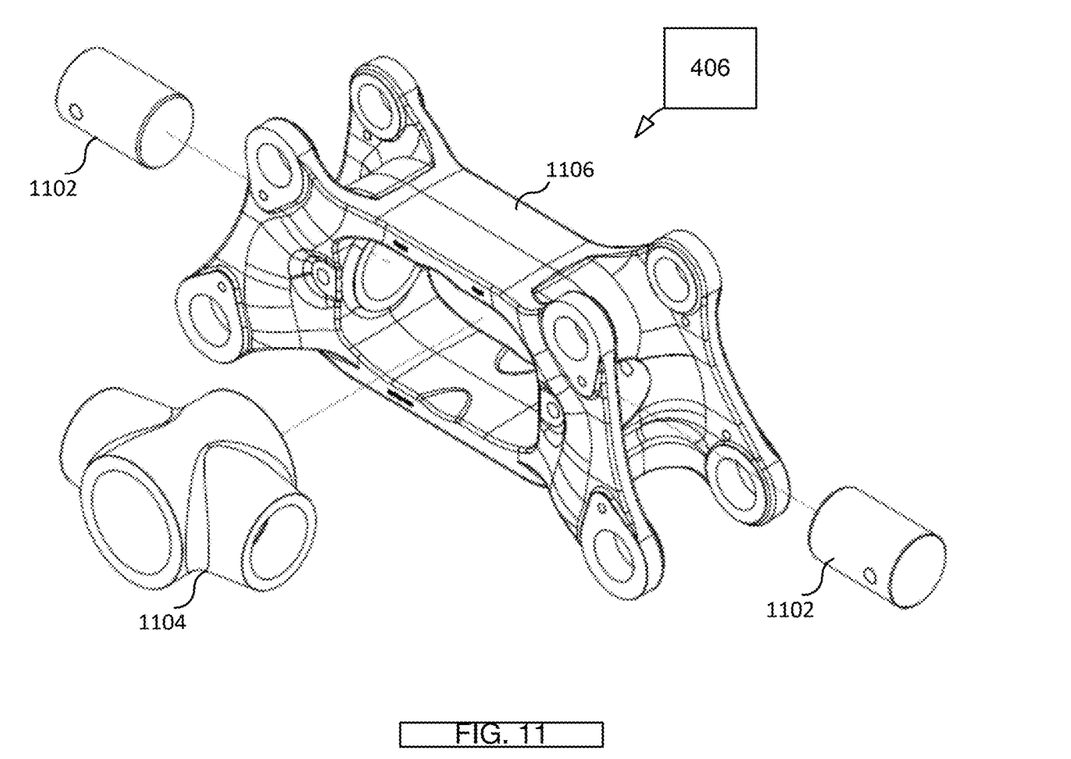
FIG. 11 is a perspective exploded view of a trunnion assembly according to an embodiment.

FIG. 11 illustrates a perspective exploded view of trunnion assembly 406 according to an embodiment of the present disclosure. Trunnion assembly 406 includes trunnions 1102 and pivoting member 1104 and camber arm housing 1106.

While the subject matter of this disclosure has been described and shown in considerable detail with reference to certain illustrative embodiments, including various combinations and sub-combinations of features, those skilled in the art will readily appreciate other embodiments and variations and modifications thereof as encompassed within the scope of the present disclosure. Moreover, the descriptions of such embodiments, combinations, and sub-combinations is not intended to convey that the claimed subject matter requires features or combinations of features other than those expressly recited in the claims. Accordingly, the scope of this disclosure is intended to include all modifications and variations encompassed within the spirit and scope of the following appended claims.

The invention claimed is:
1. A farm implement comprising:
left and right track assemblies for assisting in moving the farm implement along a ground surface in a line of travel, wherein each track assembly comprises:
a camber arm mounted in a camber arm housing, such that the camber arm permits the camber arm housing to pivot about a first axis perpendicular to the line of travel and a second axis parallel to the line of travel;
wherein the camber arm housing has a front end and a back end, and further has upper connection points on both the front end and back end and lower pivot points on both the front end and back end;
a first mounting bracket coupled to the upper connection point on the front end;
a second mounting bracket coupled to the upper connection point on the back end;
a first set arm having a first idler wheel set mounted on one end and a first bogie wheel set mounted on another end, wherein the first set arm is pivotably coupled to the first mounting bracket such that the first idler wheel set and first bogie wheel set are movable in opposing vertical directions;
a second set arm having a second idler wheel set mounted on one end and a second bogie wheel set mounted on another end, wherein the second set arm is pivotably coupled to the second mounting bracket, such that the second idler wheel set and second bogie wheel set are movable in opposing vertical directions;
wherein one or more of: the first mounting bracket is pivotably coupled to the lower pivot point on the front end and the second mounting bracket is pivotably coupled to the lower pivot point on the back end.

2. The farm implement of claim 1, further comprising a first suspension member connected to the upper connection point on the front end and between the first mounting bracket and the front end.

3. The farm implement of claim 1, further comprising a second suspension member connected to the upper connection point on the back end and between the second mounting bracket and the back end, and
wherein both of: the first mounting bracket is pivotably coupled to the lower pivot point on the front end and the second mounting bracket is pivotably coupled to the lower pivot point on the back end.

4. The farm implement of claim 2, wherein the second mounting bracket is pivotably coupled to the camber arm housing.

5. The farm implement of claim 1, wherein the first and second mounting brackets are triangle-shaped members.

6. The farm implement of claim 3, wherein the first and second suspension members comprise one or more of: a hydraulic cylinder having a hydraulic accumulator, a spring, a gas strut, and a shock.

7. The farm implement of claim 1, wherein the first set arm is pivotable about a seventh axis perpendicular to the line of travel allowing the first bogie wheel set and the first idler wheel set to move generally vertically.

8. The farm implement of claim 1, wherein the second set arm is pivotable about an eighth axis perpendicular to the line of travel allowing the second bogie wheel set and the second idler wheel set to move generally vertically.

9. The farm implement of claim 1, wherein the first axis perpendicular to the line of travel is movable generally vertically when the farm implement transitions from an unloaded configuration to a loaded configuration.

* * * * *